UNITED STATES PATENT OFFICE.

WILLIAM B. GERE, OF SYRACUSE, NEW YORK, ASSIGNOR TO MERRELL-SOULE COMPANY, OF SYRACUSE, NEW YORK, A CORPORATION OF NEW YORK.

FOOD PRODUCT.

1,215,363. Specification of Letters Patent. Patented Feb. 13, 1917.

No Drawing. Application filed February 1, 1915. Serial No. 5,501.

*To all whom it may concern:*

Be it known that I, WILLIAM B. GERE, a citizen of the United States, and resident of Syracuse, in the county of Onondaga, in the State of New York, have invented new and useful Improvements in Food Products, of which the following is a full, clear, and exact description.

This invention relates to certain improvements in food products and more particularly to a food product comprising milk, modified by the addition of milk constituents, and adapted for infant and invalid feeding.

The objects and advantages attained by this invention are:

1st. The product embodies the proper proportions of the constituents of milk in powdered form, whereby the low moisture content renders the same practically permanent especially where a considerable percentage of bacteria content has been destroyed.

2nd. The product is always uniform to conform to any predetermined formula.

3rd. The product is always ready for use, due to its permanency, and is easily prepared for use by the mere addition of the proper amount of water as compared with the difficulty of modifying cow's milk in the home, as obtained in the ordinary course of trade, to approximate mother's milk.

4th. The product is susceptible of being transported and obtained in places and under circumstances and conditions where other milk is not obtainable, unless possibly it be condensed sweetened milk.

5th. A product which may be modified by the addition of milk sugar in place of cane sugar used in condensed milk.

6th. A product which may be made to contain a larger percentage of soluble or lact-albumin than is found is cow's milk.

7th. A product in which the proportion of soluble or lact-albumin to casein may more nearly approximate mother's milk than does cow's milk.

8th. A product in which the precipitation of casein, due to acids in the stomach, is very much finer than in ordinary cow's milk and approximates mother's milk.

9th. A product in which, preferably, the lact-albumin has not been coagulated and the milk enzyms not destroyed.

Other objects and advantages will be apparent.

The problem is to so modify the constituents of milk by the addition of constituents naturally present in milk, that the composition will be adapted to the nutritive capabilities of infants and invalids, and at the same time the product must be of such a character that it is relatively permanent in its nature and ready for use anywhere at any time.

The following table shows the comparative composition of cow's milk, mother's milk, and an instance of the modified milk adapted to be produced by the method disclosed herein:

|  | Water. | Fat. | Sugar. | Casein. | Albumin. | Ash. |
| --- | --- | --- | --- | --- | --- | --- |
| Cow's milk | 87.10 | 3.90 | 4.75 | 3.00 | .40 | .75 |
| Mother's milk | 88.2 | 3.3 | 6.8 | 1.00 | .5 | .2 |
| Modified milk (reconstituted) | 89.1 | 2.0 | 6.4 | .9 | .8 | .8 |

By comparing the above figures, it is obvious that the fat content of the mother's milk is higher than that in the modified milk. This is so for the reason that in many cases the infant cannot assimilate the same amount of fat in cow's milk that it might in mother's milk, there being a slight difference in their composition. In normal cases the fat may be readily increased by the addition of a small amount of fresh cream. One of the main difficulties in feeding cow's milk to infants lies in the fact that the milk sugar content is too low by about 1¼%. An attempt is made, in home modification, to overcome this deficiency by the addition of commercial sugar of milk. Some of the desirable qualities of the original lactose are, however, destroyed by the process of refining and as satisfactory results cannot be obtained by the use of added sugar of milk as can be obtained from using the right proportion of lactose as supplied in the original milk.

By far the most important change necessary in the composition of cow's milk before it is adapted to very young infants is a carefully adjusted "split proteid modification". This means that the quantitative relation of its proteids, casein and lact-albumin, shall have been adjusted so that the final product shall contain considerably more lact-albumin and considerably less casein than cow's milk.

In home modification there has been no way to restore the most important and easily digested of the two proteids in milk, namely: milk albumin. The next best thing is therefore attempted—the addition of a grain extract, such as barley water, to prevent the precipitation of the excess casein in hard lumps in the stomach. By means of the process through which this modified milk must pass, the casein therein is not only less in amount than in plain cow's milk, but also precipitates in acid solutions more similarly to human milk than to cow's milk; that is, very much finer. By comparing the approximate analyses given, it will be seen that in the modified milk the per cent. of casein to albumin compares very favorably. Lime water may be added to increase the ash content.

In order to make such a modified milk, it is necessary to add lactose (milk sugar) and lact-albumin and to reduce the amount of casein. This may be accomplished by blending cream, milk (skimmed or whole), with whey. Whey is obtained by removing casein from skimmed milk, or fat and casein from whole milk, by means of rennet or other means, leaving as whey the lact-albumin (soluble) and lactose (milk sugar) dissolved in water. The modified milk thus obtained,—by manipulation of the proportions of cream, milk and whey used, a modified milk of practically any desired composition can be obtained,—is then ready to be dried. This may be done by any of the means now known for drying organic substances such as milk, but I prefer to employ a process such as that described in Letters Patent granted to R. Stauf, No. 666,711, in combination with the process described in Letters Patent No. 860,929, granted to Lewis C. Merrell, Irving S. Merrell and myself. That is, condense the modified milk *in vacuo* and spray it at high pressure as described in Letters Patent No. 1,020,632, granted to Bevenot and De Neveu, into moisture absorbing air.

I do not confine myself to this method of making the modified milk powder. It can be accomplished by mechanically mixing cream powder, milk powder, and whey powder dried as above described. The product may thus be made to contain the correct proportion of ingredients, but will naturally be not as homogeneous as that which is desiccated after modifying.

The moisture content of the powdered product should not exceed three per cent. in any case, and in powders embodying considerable percentages of butter fats, as is often desirable in a modified milk for infant and invalid feeding, the moisture content may be considerably lower, preferably not in excess of one and one-half per cent.

In combination with the low moisture-content referred to, the powdered product should also contain but a relatively small number of bacteria, preferably not to exceed fifteen hundred (1500) per gram.

Although I have described one particular method as preferable in carrying out each of the steps of the method herein described, such as the use of whey as a modifying agent and the desiccation of the solution formed by the modification by bringing the same in finely divided form into moisture absorbing air, whereby a soluble product is produced, and have set forth one particular percentage of constituents in the modified product as being in certain cases preferable, I do not desire to limit myself to any particular sequence of steps or particular embodiments or methods comprising the separate steps or to any particular percentages of milk constituents, as many changes may be made in the details of the process and the proportions of constituents in the product without departing from the spirit of this invention as set forth in the appended claims.

What I claim is:

1. A soluble powdered milk of approximately the following composition: 18 per cent. butter fat; 57.8 per cent. milk sugar; 8.6 per cent. casein; 7.5 per cent. lact-albumin; 7.3 per cent. ash; 1.2 per cent. moisture.

2. A soluble powdered milk containing active enzyms and of approximately the following composition: 18 per cent. butter fat; 57.8 per cent. milk sugar; 8.6 per cent. casein; 7.5 per cent. lact-albumin; 7.3 per cent. ash; 1.2 per cent. moisture.

3. A soluble powdered milk which reacts to the Leffman test for enzyms and of approximately the following composition: 18 per cent. butter fat; 57.8 per cent. milk sugar; 8.6 per cent. casein; 7.5 per cent. lact-albumin; 7.3 per cent. ash; 1.2 per cent. moisture.

4. A soluble powdered milk composed of spherical particles and of approximately the following composition: 18 per cent. butter fat; 57.8 per cent. milk sugar; 8.6 per cent. casein; 7.5 per cent. lact-albumin; 7.3 per cent. ash; 1.2 per cent. moisture.

5. A soluble powdered milk composed of spherical particles and characterized by the practical absence of bacteria and the presence of active enzyms and which is of approximately the following composition: 18 per cent. butter fat; 57.8 per cent. milk sugar; 8.6 per cent. casein; 7.5 per cent. lact-albumin; 7.3 per cent. ash; 1.2 per cent. moisture.

6. A soluble powdered milk composed of spherical particles comprising homogeneously distributed cow's milk and additional milk sugar and lact-albumin, and characterized by the practical absence of bacteria and the presence of active enzyms.

7. A soluble food product in powdered form consisting of substantially dry spherical particles comprising homogeneously distributed cow's milk and additional milk sugar and lact-albumin.

In witness whereof I have hereunto set my hand this 30th day of January, 1915.

WILLIAM B. GERE.

Witnesses:
  E. A. THOMPSON,
  VIOLA HOWLAND.